(12) United States Patent
Gardner et al.

(10) Patent No.: US 8,662,004 B2
(45) Date of Patent: Mar. 4, 2014

(54) BALLOON FILL GAUGE

(75) Inventors: Scott W. Gardner, Wayzata, MN (US);
Daniel G. Cook, Maple Plain, MN (US);
Anna C. Cook, Maple Plain, MN (US)

(73) Assignee: Anagram International, Inc., Eden Prairie, MN (US)

( * ) Notice: Subject to any disclaimer, the term of this patent is extended or adjusted under 35 U.S.C. 154(b) by 362 days.

(21) Appl. No.: 13/010,472

(22) Filed: Jan. 20, 2011

(65) Prior Publication Data
US 2012/0186508 A1    Jul. 26, 2012

(51) Int. Cl.
| G01B 5/08 | (2006.01) |
| G01B 3/10 | (2006.01) |
| G01L 7/00 | (2006.01) |
| G01L 17/00 | (2006.01) |

(52) U.S. Cl.
USPC .................. 116/212; 116/DIG. 34; 33/555.4

(58) Field of Classification Search
USPC ........ 116/200, 212, DIG. 34; 73/762; 33/755, 33/758, 759, 555.1, 555.4
See application file for complete search history.

(56) References Cited

U.S. PATENT DOCUMENTS

| 1,759,219 | A | * | 5/1930 | Bowlus | 33/787 |
| 3,572,091 | A | * | 3/1971 | McFarland | 73/760 |
| 3,613,679 | A | * | 10/1971 | Bijou | 602/75 |
| 4,211,241 | A | * | 7/1980 | Kaster et al. | 600/587 |
| 4,213,463 | A | * | 7/1980 | Osenkarski | 600/392 |
| 4,428,385 | A | * | 1/1984 | Morales | 600/587 |
| 4,433,486 | A | * | 2/1984 | Muehlenbein | 33/501 |
| 4,730,646 | A | * | 3/1988 | Traub | 141/4 |
| 4,920,659 | A | * | 5/1990 | Becher | 33/555.4 |
| 4,958,853 | A | * | 9/1990 | Doty | 280/801.1 |
| 6,510,617 | B1 | * | 1/2003 | Gerdes et al. | 33/484 |
| 6,609,865 | B2 | * | 8/2003 | Daigneault | 411/13 |
| 7,730,846 | B2 | * | 6/2010 | Pett et al. | 116/212 |
| 7,856,730 | B2 | * | 12/2010 | Sakai et al. | 33/543.1 |
| 7,938,468 | B2 | * | 5/2011 | Mueller | 294/74 |
| 2003/0144596 | A1 | * | 7/2003 | Tsubata | 600/500 |
| 2007/0028475 | A1 | * | 2/2007 | Chiu | 33/555.4 |
| 2010/0130315 | A1 | * | 5/2010 | Steidle | 473/570 |
| 2013/0192512 | A1 | * | 8/2013 | Erickson | 116/201 |

FOREIGN PATENT DOCUMENTS

| CA | 2043346 A | * | 11/1992 | G01B 5/08 |
| FR | 2665528 A1 | * | 2/1992 | E04G 23/02 |
| GB | 2110372 A | * | 6/1983 | G01B 5/30 |
| JP | 62267601 A | * | 11/1987 | G01B 5/08 |

(Continued)

*Primary Examiner* — R. A. Smith
(74) *Attorney, Agent, or Firm* — Gerald E. Helget; Briggs and Morgan, P.A.

(57) ABSTRACT

A balloon fill gauge for a balloon made of elastomeric expanding material has a base sheet with balloon filling indicia thereon that is temporarily tackable on to the balloon face material. An indicator tab with two ends having one end temporarily tackable onto the balloon material has its other end slideably interlockable with the base sheet. An indicator mark on the tab is alignable with the balloon filling indicia to indicate when the balloon is full as the tacked base sheet and tacked indicator tab move apart during the filling of the balloon. The balloon fill gauge alternatively may have an elongate non-stretchable indicator tab having two ends tackable onto the balloon material which physically acts to visual indicate when the balloon is full by snapping in two, popping off the balloon or changing color. Alternatively, the balloon filler gauge may include a base sheet with a balloon filling indicia temporarily tackable onto the balloon which is indexed with an expansible indicator ink mark on the balloon alignable with the filling indicia to indicate upon expansion of the ink mark when the balloon is full or the ink otherwise changes color.

20 Claims, 6 Drawing Sheets

(56) References Cited

FOREIGN PATENT DOCUMENTS

| JP | 01295101 | A | * | 11/1989 | ............... | G01B 5/08 |
| JP | 2001091391 | A | * | 4/2001 | ............... | G01L 17/00 |
| JP | 2002005606 | A | * | 1/2002 | ............... | G01B 5/08 |
| JP | 2012132884 | A | * | 7/2012 | ............... | G01B 5/08 |

* cited by examiner

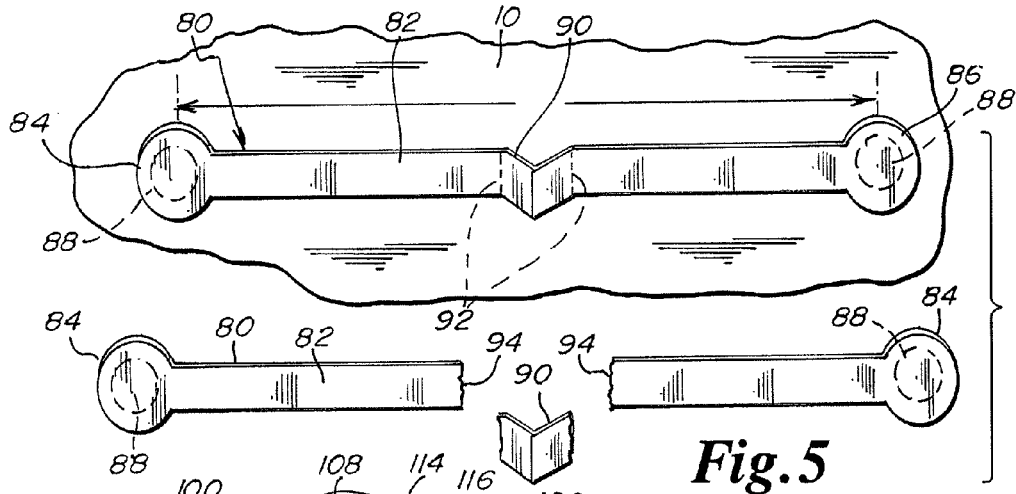
Fig. 5
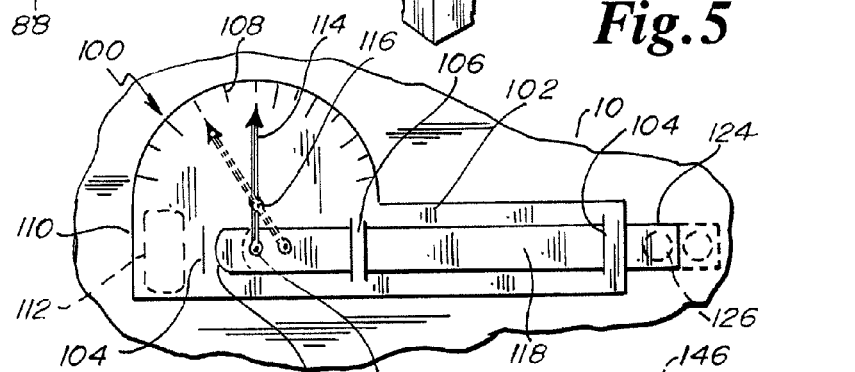
Fig. 6
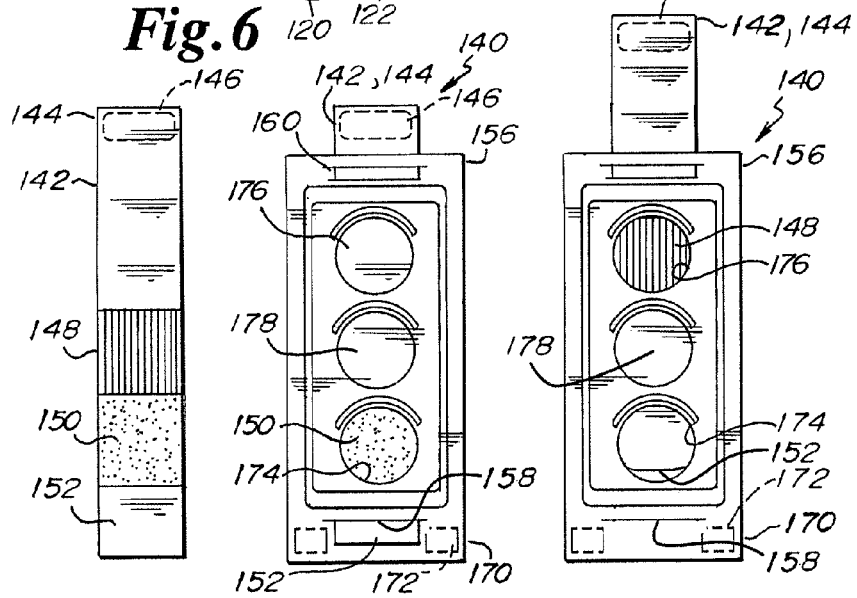
Fig. 7   Fig. 7A   Fig. 7B

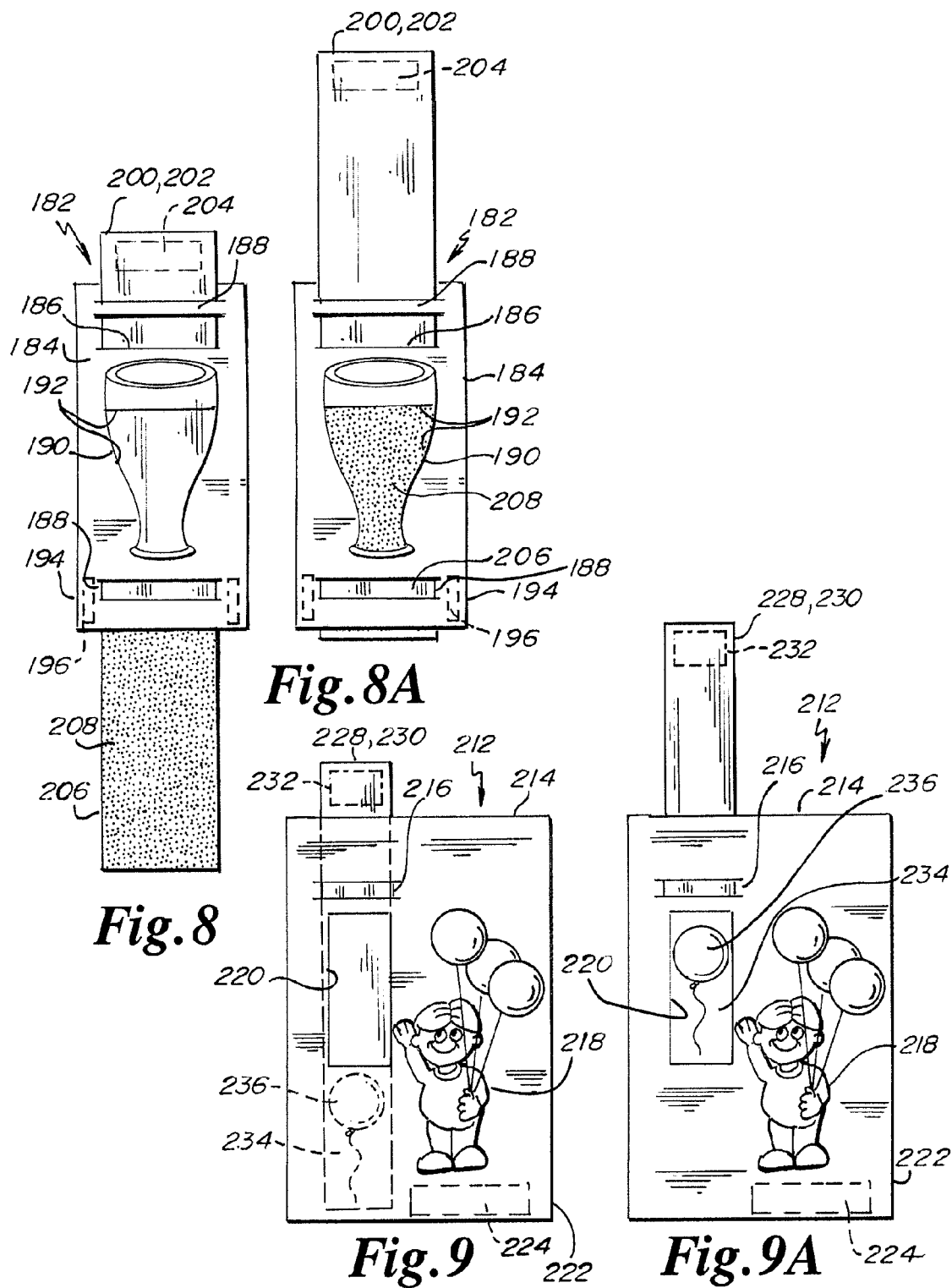

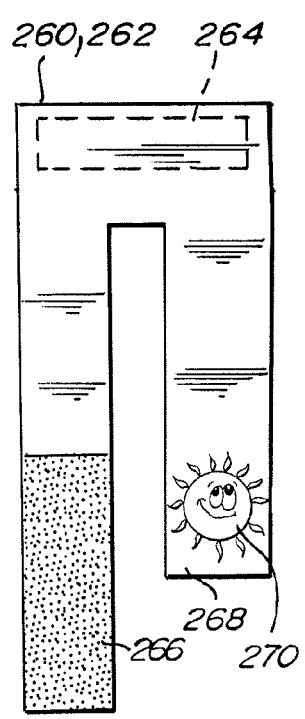
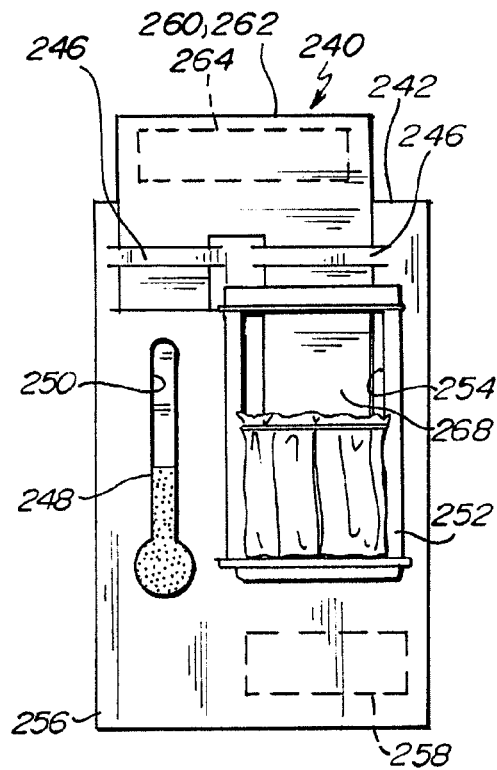
*Fig.10*  *Fig.10A*
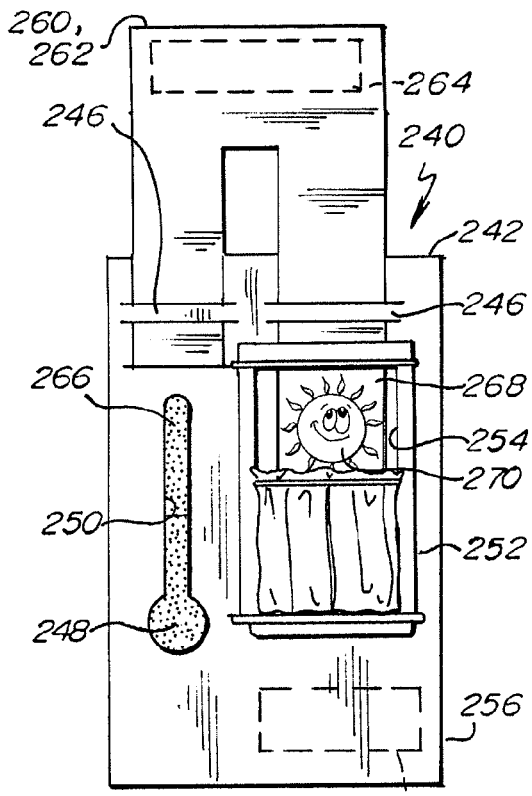
*Fig.10B*

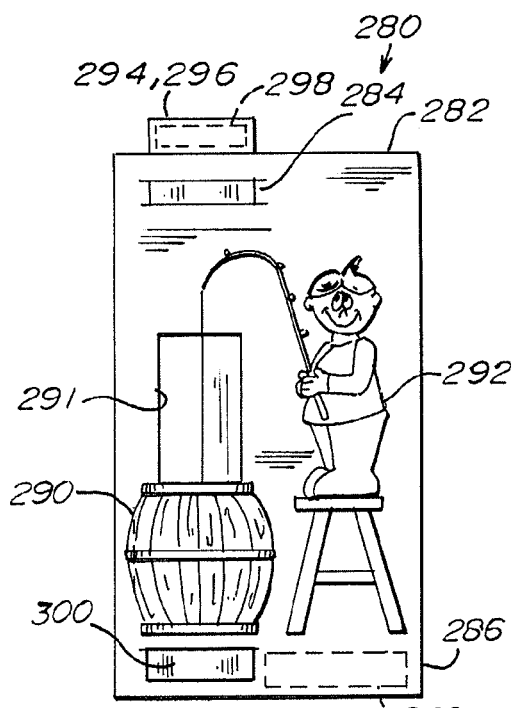
Fig. 11
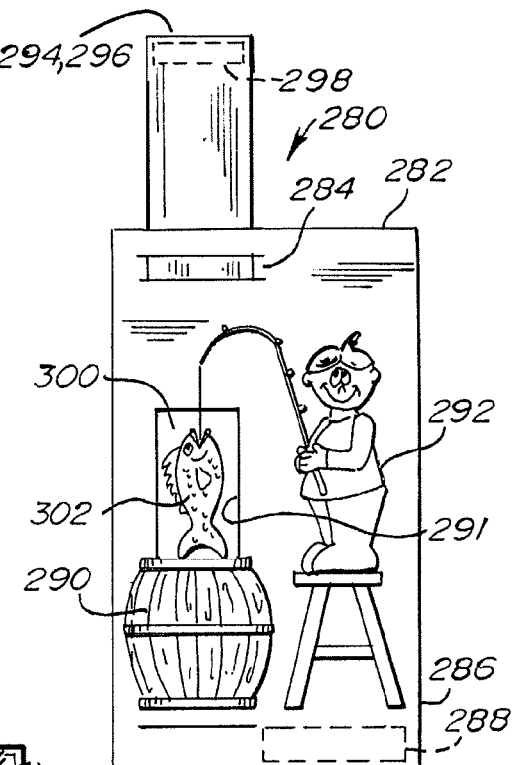
Fig. 11A
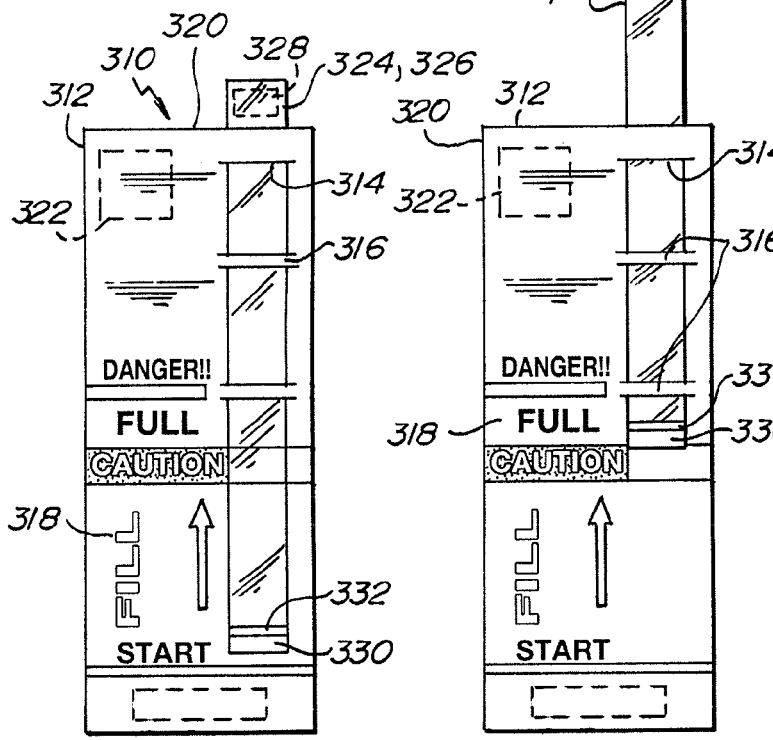
Fig. 12          Fig. 12A
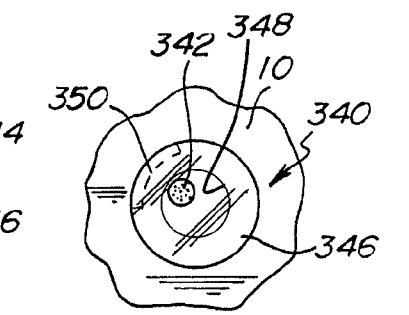
Fig. 13
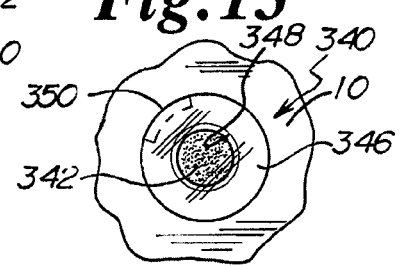
Fig. 13A

BALLOON FILL GAUGE

BACKGROUND OF THE INVENTION

The present invention relates to inflating balloons made of expanding materials to a safe limit, and more particularly to a balloon fill gauge tackable to a balloon that indicates when the balloon materials have expanded to their maximum capacity before the balloon might otherwise burst or explode which may cause damage and/or injury.

Referring to prior art FIGS. 1A-E, balloon 10 can be made of any shape, including specific novelty characters and cartoons, but also may be generally pillow shaped to spherical as illustrated. Balloons 10 typically may have a seam 14 wherein the balloon 10 is made of two sheets of materials discussed below. Alternatively, balloons 10 may be made of a seamless material, such as a unitary latex balloon. Nearly all balloons have valves 12 into which is inserted an inflation nozzle which may or may not be regulated to inflate the balloon 10 to a certain level after which the nozzle is removed and the valve is self-sealing or a knot may be placed thereat.

Commonly flat balloons 10 shown in FIG. 1-A may be inflated to approximately as shown in 1-C (pillow shaped) where the specific balloon materials may not have significant elasticity or expansion characteristics. In this scenario, balloon 10 clearly has wrinkles 16 about the seam or periphery 14 of the material. In some cases, the balloons are desired to be inflated to create a full spherical look, as shown in FIG. 1-E, wherein all the wrinkles 16 have disappeared adjacent seam 14.

In the prior balloon filling scenario in FIG. 1A-1E, it is very difficult for the balloon inflator to know when to stop inflating the balloon before the balloon might explode. Such balloon inflators are very cautious about not exploding balloons and are instructed to wear both eye and ear protection when inflating balloons should they explode so to avoid injury. FIG. 1A-E is an actual illustration on a balloon package for the balloon inflator to follow as to stop filling the balloon when it has become very round and the wrinkles and bumps 16 have disappeared from the balloon typically around the seam 14.

Balloons may be made of a variety of expandable materials including latex, polyester, nylon, polyethylene, polyethylene terephthalate (PET), metalized polymaides (nylon 6), and metalized layers sealed between a polymeric film and an elastomeric sealant just to name a few. The stretchability or expandability of these balloon materials may further be enhanced by the addition of elastomers to the specific materials.

Balloons are inflated with gas (air or helium) suitability from gas tanks located at retail outlets which may have 80-90 PSI of compressed gas within the tanks. At the top of the gas tanks may be located inflators or nozzles just after the on/or valve which may be inserted into the balloon valves for inflation. The gas flow pressure may be controlled by regulators and also additional regulators may be used to only allow up to a range of 0.5 to 0.7 PSI or 16-18 inches of water column pressure to assure that the balloon 10 does not over inflate and explode. These regulators are common for character balloons that do not require that they be completely round, ball-like or spherical. For spherical balloons, a gas flow rate regulator may include a 0.125 (⅛) inch orifice.

Devising regulators to allow the inflation of a balloon to a round, ball like or spherical geometric shape without reaching maximum capacity typically followed by explosion are expensive and difficult to design. One such effort might include a regulator gas flow rate together with an electronic timer which would assure balloon 10 would reach its spherical shape without explosion. Again, this construction of a regulator is contemplated to be expensive and not desirable by the tens of thousands of stores who sell flat balloons to their customers and inflate them for immediate enjoyment often with helium which makes the balloons lighter than air and float upwardly.

There is a need for a balloon fill gauge for balloons made of elastic material that are not expensive such as the regulators positioned on the gas tanks. Such a balloon fill gauge should be inexpensive, a language-free visual gauge, does not require safety equipment, is easily removable from the balloon after inflation, is visually easy to determine when the balloon is fully inflated, is fun to watch the balloon inflate as well as the gauge and takes the danger and guessing out of balloon inflation.

SUMMARY OF THE INVENTION

A balloon fill gauge for a balloon made of elastomeric expanding material has a base sheet with balloon filling indicia thereon that is temporarily tackable on to the balloon face material. An indicator tab with two ends having one end temporarily tackable onto the balloon material has its other end slideably interlockable with the base sheet. An indicator mark on the tab is alignable with the balloon filling indicia to indicate when the balloon is full as the tacked base sheet and tacked indicator tab move apart during the filling of the balloon. The balloon fill gauge alternatively may have an elongate non-stretchable indicator tab having two ends tackable onto the balloon material which physically acts to visual indicate when the balloon is full by snapping in two, popping off the balloon, or changing color. Alternatively, the balloon filler gauge may include a base sheet with a balloon filling indicia temporarily tackable onto the balloon which is indexed with an expansible indicator ink mark on the balloon alignable with the filling indicia to indicate upon expansion of the ink mark when the balloon is full or the ink otherwise changes color.

A principal object of the balloon fill gauge of the present invention is that it is very inexpensive in its manufacture making it highly desirable for tacking onto all balloons that otherwise may be filled beyond capacity and explode.

Another object and advantage of the present invention is that the balloon fill gauge may be visual in nature and free of any and all language thereby making the balloon fill gauge desirable throughout the world.

Another object and advantage of the present invention is that the balloon fill gauge tells the balloon inflator when the balloon is full to capacity thus avoiding explosion caused by over inflation and dismissing the need for protective ear and eye safety equipment.

Another object and advantage of the present invention is that the balloon fill gauge is easily removable from the balloon after inflation with any suitable pressure sensitive adhesive (PSA).

Another object and advantage of the present invention is that it easily visually allows a determination when the balloon is fully inflated.

Another object and advantage of the present invention is that the balloon fill gauge is actually fun to watch.

Another object and advantage of the present balloon fill gauge is that it takes the danger and guesswork out of the balloon inflation operation when attempting to fill the balloon to maximum capacity before explosion.

BRIEF DESCRIPTION OF THE DRAWINGS

FIG. 5 is a front elevational view of another embodiment of the gas fill gauge made of an elongate nonstretchable material in the form of an indicator tab tacked on to the balloon material which visibly breaks when the balloon has reached full gas capacity.

FIG. 6 is another embodiment of the balloon fill gauge in its resting state tacked on to the balloon showing a meter indicia which is also shown in phantom outline when the balloon is inflated to full capacity.

FIGS. 7, 7A and 7B show another embodiment of a novelty traffic stoplight balloon fill gauge of the present invention in its resting and balloon full state.

FIGS. 8 and 8A show another embodiment of a novelty empty/full glass balloon fill gauge showing the gauge in its resting state (FIG. 8) and balloon filled to capacity state (FIG. 8A).

FIGS. 9 and 9A is another embodiment of a novelty boy holding filled balloons balloon fill gauge of the present invention.

FIGS. 10, 10A and 10B show another embodiment of a novelty thermometer and rising sun in a window balloon fill gauge of the present invention in empty and full states.

FIGS. 11 and 11A show another embodiment of a novelty fisherman with a fish in the barrel balloon fill gauge of the present invention in empty and full states.

FIGS. 12 and 12A show another embodiment of the balloon fill gauge of the present invention in empty and full states.

FIGS. 13 and 13A show another embodiment of an expanding metered dot balloon fill gauge of the present invention in empty and full states.

DETAILED SPECIFICATION

Figures 1A, 1B, 1C, 1D, 1E:
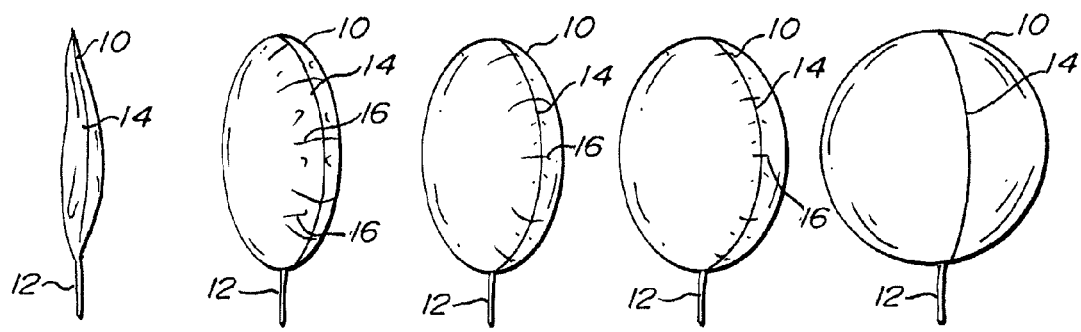
FIGS. 1A-1E are prior art front prospective views of the inflation of a balloon from a flat condition to a spherical condition.
Figure 2:
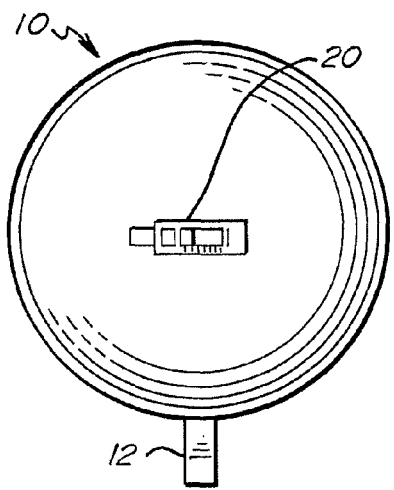
FIG. 2 is a front elevational view of a balloon with a balloon fill gauge of the present invention tacked thereon.

Referring to FIG. 2, a balloon 10 is shown with its valve 12 having a balloon fill gauge 20 tacked thereon indicating that the balloon has been filled to spherical capacity short of explosion.

Figure 3:
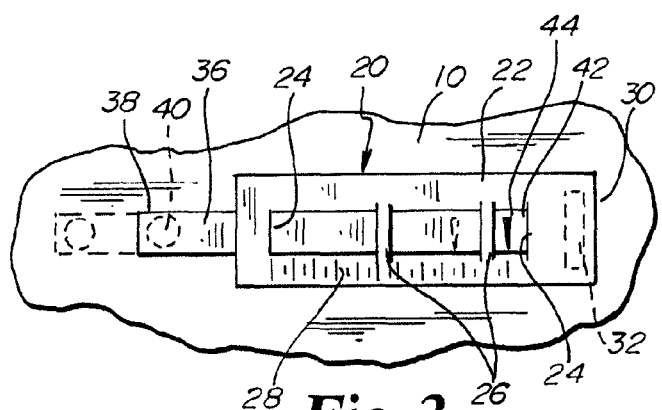
FIG. 3 is a front elevational view of the balloon fill gauge tacked on to a balloon in flat condition with the fully inflated balloon showing the gauge in phantom outline.

FIG. 3 shows a balloon fill gauge 20 when the balloon 10 is empty or flat. The gauge 20 has a rectangular base sheet 22 with slits 24 and bridges 26 therein. Gauge indicia 28 in the form of ruler increments is placed onto the base sheet 22. The bottom end 30 is tacked on to the balloon 10 with pressure sensitive adhesive 32 as is both readily known and available. The indicator tab 36 is elongate and slideably interlockable with the base sheet 22 as the tab 36 is mounted to the sheet 22 by passing through slits 24 and underneath bridges 26. The indicator tab 36 is elongate and at its top left one end 38 on its back side is a pressure sensitive adhesive (PSA) 40. The lower or bottom right end 42 is similarly marked with PSA 40 on its backside while an indicator mark 44 similar to a gauge needle is marked thereon. It can be seen as the balloon material expands, the indicator tab 36 moves outwardly or leftwardly to move the indicator mark 44 along the gauge indicia 28 to indicate with the balloon fill gauge when the balloon has been filled to maximum capacity.

Figure 4:
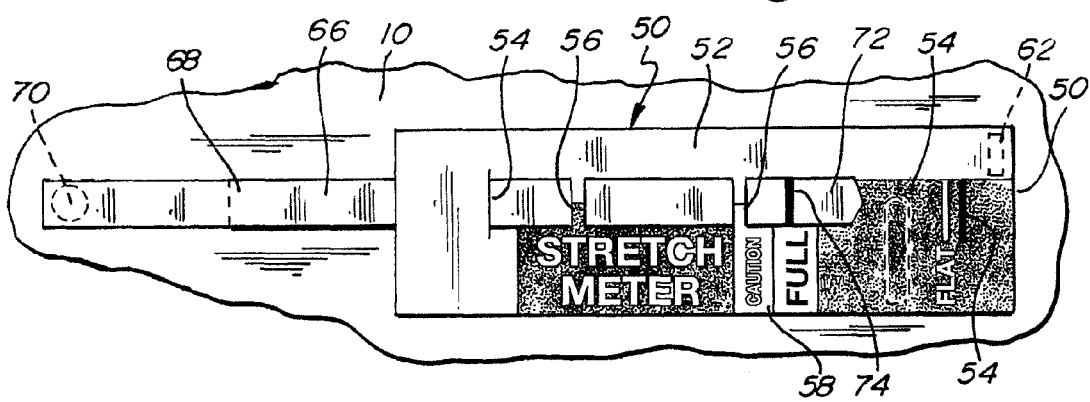
FIG. 4 is another front elevational view of a gas fill gauge tacked on to a balloon showing the gauge in a balloon fully inflated state tacked on a balloon with the gauge shown in phantom outline when the balloon is in a flat not inflated condition.

FIG. 4 shows another balloon fill gauge 50 when the balloon 10 has been filled to maximum capacity. The gauge 50 has a rectangular base sheet 52 with slits 54 and bridges 56 therein. The gauge indicia 58 is marked with words or as otherwise color coded. The bottom end 60 of base sheet 52 on its backside has PSA 62 for tacking onto balloon material. The indicator tab 66 is elongate and has its top of left one end 68 marked with PSA 70 on its backside. The lower bottom right end 72 has an indicator mark 74 similar to a gauge needle. The indicator tab 66 is slideably interlockable within the gauge base sheet 52 by passing through slits 54 and under bridges 56.

Referring to FIG. 5, another embodiment of the balloon fill gauge 80 is shown. The elongate non-stretchable indicator tab 82 has its first end 84 and second end 86 marked with PSA 88 on their backsides. The tab 82 has a fold 90 adjacent perforations 92 which will create a break 94 in indicator tab 82 when the balloon has fully expanded as the tab 82 is pulled apart by the PSA 88 at first and second ends 84 and 86 respectively.

Referring to FIG. 6, a balloon fill gauge embodiment 100 is shown in the nature of a strain gauge. The base sheet 102 supports slits 104 and bridges 106. The base sheet 102 has a meter indicia 108 thereon. The bottom or left end 110 suitably has PSA 112 tacked thereon onto its backside. In the area of the meter indicia 108 is located a needle 114 that is pivotably mounted at 116. The elongate indicator tab 118 at its bottom or left end supports needle 114 at a second pivotal mount 122. The top or right end 124 of tab 118 also has PSA 126 suitably placed on the backside. As the base sheet 102 and the indicator tab 118 move apart under the forces of the PSA 112 and 126, the needle 114 raises adjacent the meter indicia 108 to indicate when the balloon 10 is full.

FIGS. 7, 7A and 7B show a novelty traffic stoplight balloon fill gauge 140 having an indicator tab 142. Adjacent the indicator tab 142 top 144 on its backside is PSA 146. The intermediate red section 148 is above the lower green section 150 below which is also bottom 152 of tab 142. FIGS. 7A and 7B show that the base sheet 156 has a slit 158 and bridge 160.

The bottom 170 has PSA 172 located on its backside. The traffic light housing depicted on the base sheet 156 has a lower green circular cutout 174 while at its top it has top red light circular cutout 176. The intermediate light section 178 is not cutout and may be colored yellow. In operation, as the indicator tab 142 and the base sheet 156 separate as the balloon is inflated, the traffic light changes from a green light to a red light indicating that the balloon is now full to capacity.

Referring to FIGS. 8 and 8A, the novelty empty/full glass balloon fill gauge 182 embodiment of the present invention is shown. The base sheet 184 has a slit 186 and bridges 188. The glass 190 has a liquid cutout portion 192. The bottom 194 of base sheet 184 has PSA 196 tacked onto its backside. The indicator tab 200 has a top portion 202 which has PSA 204 tacked onto its backside. The bottom 206 has just above an intermediate colored portion 208, suitably for example in a yellow color. As the indicator tab 200 and base sheet 184 pull apart during inflation of the balloon, the intermediate color section 208 moves into the cutout portion 192 to indicate that glass 190 is completely full when the balloon has been filled to maximum capacity.

Referring to FIGS. 9 and 9A, the novelty boy holding filled balloons balloon fill gauge 212 is shown. The gauge 212 includes a base sheet 214 having a bridge 216. The base sheet 214 has an indicia of a boy with balloons 218 and an adjacent cutout window 220. The bottom 222 of the base sheet 214 has PSA 224 marked on its backside. The indicator tab 228 has a top portion 230 on its backside there is located PSA 232. The lower end 234 of tab 228 has a filled balloon 236 printed thereon. As the base sheet 212 and indicator tab 228, both of which are tacked onto the balloon material, move apart when filling the balloon, the filled balloon 236 moves upwardly to fill the cutout or window 220 indicating that the balloon is full and ready for the boy to grab.

FIGS. 10, 10A and 10B illustrate a novelty thermometer and rising sun and a window balloon fill gauge 240. The base sheet 242 has a bridge 246 and a thermometer 248 depicted thereon. A cutout 250 is located in the upper portion of the thermometer 248. The window 252 has a window cutout portion 254. The bottom 256 of the base sheet 242 has PSA 258 placed on its backside. The indicator tab 260 has a top portion 262 which has PSA 264 located on its backside. The indicator tab 260 has a depending first portion marked with red indicia 266. The depending second portion 268 is marked with a sun indicia 270. The tab is slideably interlockable with the base sheet 242 by the depending portions 266 and 268 being passed through and interlocked with bridges 246. As the balloon tacked base sheet 242 and indicator tab 260 move apart upon inflation of the balloon, the temperature in the thermometer 248 is increased while the sun indicia 270 is also lifted upwardly along with the red indicia of the first pending portion 266 to indicate the temperature increase and the sun rising—all identifying with the balloon being filled to maximum capacity.

FIGS. 11 and 11A depict a novelty fisherman with a fish in a barrel balloon fill gauge 280 of the present invention. Base sheet 282 has a bridge 284 and its bottom portion 286 similarly is marked with PSA 288 on its backside. The base sheet 282 has a barrel 290 with a cutout portion of 291 above the barrel 290. The fisherman 292 is depicted adjacent the barrel 290 on the base sheet 282. The indicator tab 294 has a top portion 296 tacked with PSA 298 on its backside. The tab 294 backside at its bottom portion 300 has a fish indicia 302 thereon. When the balloon tacked base sheet 282 and the indicator tab 294 move apart with expansion of the balloon, the fisherman 292 is seen to have caught a fish 302 coming out of the barrel 290 as the fish 302 moves into the cutout portion 291.

Referring to FIGS. 12 and 12A, another balloon fill gauge 310 of the present invention is shown. The rectangular base sheet 312 has slits 314 and bridges 316 therein. There is gauge indicator 318 marked on the sheet 312. The top portion 320 has PSA 322 located on its backside. The indicator tab is made of a clear plastic 324. The top portion 226 is marked on its backside with PSA 328. The bottom portion 330 of the tab 324 has an indicator mark or needle 332 thereon. When the balloon tacked base sheet 312 and indicator tab 324 are moved apart as the tab 324 slides in slits 314 and bridges 316, the indicator mark or needle 332 moves along the gauge indicia 318 identifying when the balloon has been filled to capacity.

Referring to FIGS. 13 and 13A, an expanding metered dot balloon fill gauge 340 is shown. The balloon material 10 has an ink dot 342 placed thereon that is expandable or otherwise may change colors as the balloon material is expanded during the filling of the balloon. The base sheet 346 may be clear having a central ring 348. Alternatively, the base sheet 348 may be made of paper and have a cutout 348 in the position of central ring 348. The base sheet 346 has PSA 350 located on its backside somewhat close to the ink dot 342. As the balloon is inflated, the ink dot 342 expands or suitably may change colors. As the ink dot 342 fills the balloon tacked central ring 348, the balloon inflator knows that the balloon 10 is filled to capacity.

Figure 14:
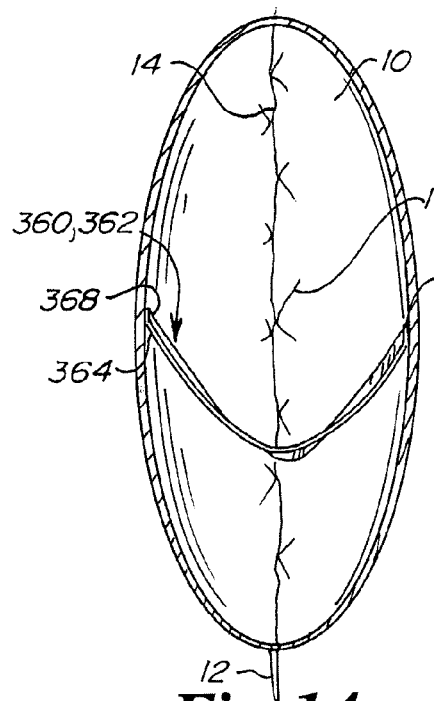
FIGS. 14 and 14A show another embodiment of the balloon fill gauge of the present invention in empty and full states.
Figure 14A:
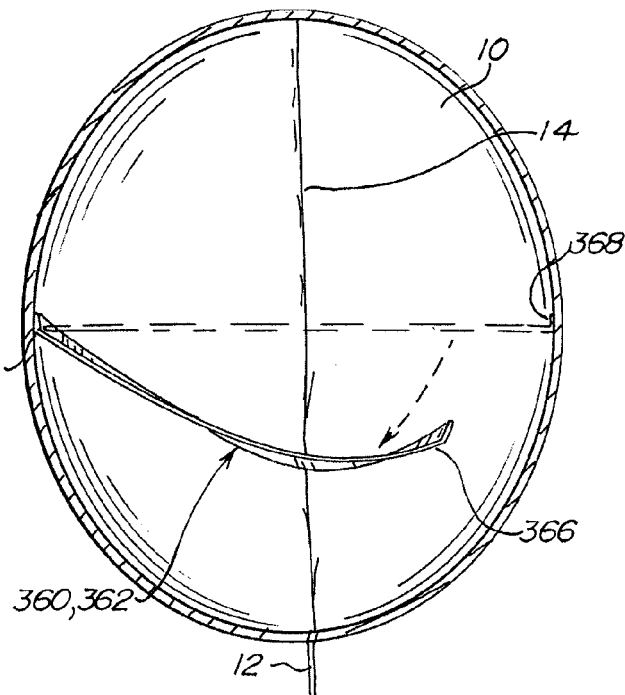

Referring to FIGS. 14 and 14A, the cross-sectioned balloon 10 may have a balloon fill gauge 360 located on its inside. The elongate non-stretchable indicator tab 362 may have certain inks thereon that change color as it is stretched. The ends 364 and 366 of tab 362 suitable have PSA 368 fixed thereat. As the balloon inflates to maximum capacity, the balloon fill gauge 360 pops off of the inside wall of the balloon 10 or suitable also may change colors.

Figure 15:
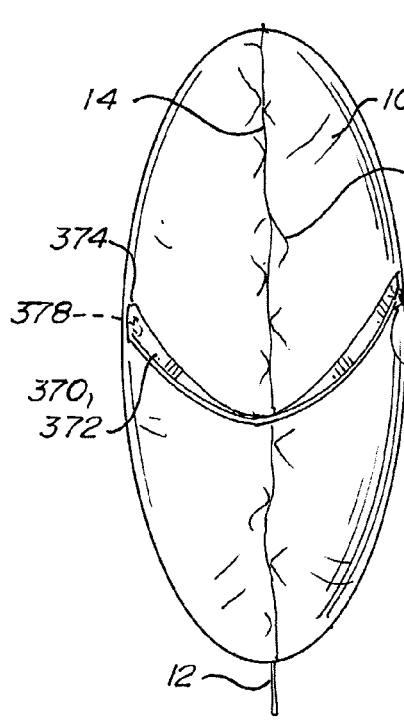
FIGS. 15 and 15A show yet another embodiment of the balloon fill gauge of the present invention in empty and full states.
Figure 15A:
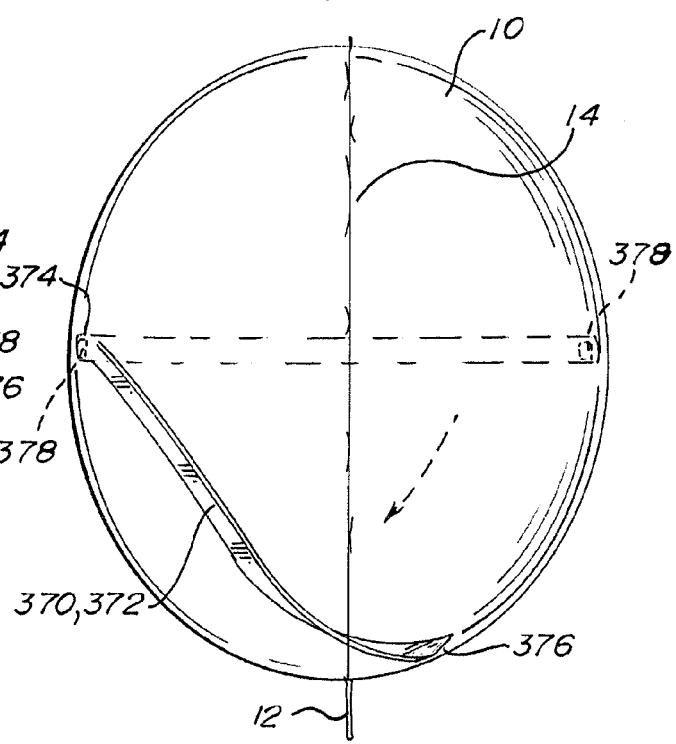

Referring to FIGS. 15 and 15A, the balloon 10 on its outside has a balloon fill gauge 370 which includes elongate non-stretchable indicator tab 372. Ends 374 and 376 are suitably coated with PSA 378 and tacked to balloon 10. As the balloon is filled and upon reaching spherical geometry, the indicator tab 372 may pop off the balloon 10 or otherwise change colors if certain color changing stretch inks are applied thereon.

The above embodiments are for illustrative purposes only. The true breath and scope of the present invention is to be understood by the following claims.

What is claimed is:

1. A balloon fill gauge for a balloon made of an elastomeric material, comprising:
   a) a nonstretchable base sheet with balloon filling indicia thereon temporarily tackable onto the inside of the balloon material;
   b) a nonstretchable indicator tab with two ends having one end temporarily tackable onto the balloon material with the other end slideably interlockable with the base sheet; and
   c) an indicator mark on the tab alignable with the balloon filling indicia to indicate when the balloon is full as the tacked base sheet and the tacked indicator tab move apart.

2. The balloon fill gauge of claim 1, wherein the balloon fill gauge is removably tackable to the balloon material with pressure sensitive adhesive.

3. The balloon fill gauge of claim 1, wherein the balloon fill gauge is removably tackable to the balloon material on the outside of the balloon.

4. The balloon fill gauge of claim 1, wherein the balloon filling indicia is language-free and the indicia is color coded.

5. The balloon fill gauge of claim 1, wherein the balloon filling indicia is language-free and a novelty visual.

6. The balloon fill gauge of claim 1, wherein the base sheet and indicator tab is made from one of a group comprising paper or plastic.

7. The balloon fill gauge of claim 1, wherein the indicator tab visually indicates the balloon is full by at least one end popping off the balloon material.

8. A balloon fill gauge for a balloon made of an elastomeric material, comprising an elongate non-stretchable indicator tab of pre-set length having two ends each removably tackable on the balloon material with pressure sensitive adhesive at a measured distance apart as to visually indicate by the tab breaking apart when the balloon is full.

9. The balloon fill gauge of claim 8, wherein the indicator tab is made from one of a group comprising paper or plastic.

10. The balloon fill gauge of claim 8, wherein the balloon fill gauge is removably tackable to the balloon material on the inside of the balloon.

11. The balloon fill gauge of claim 8, wherein the balloon fill gauge is removably tackable to the balloon material on the outside of the balloon.

12. The balloon fill gauge of claim 8, wherein the balloon fill gauge has color changing ink to indicated when the balloon is full.

13. A balloon fill gauge for a balloon made of an elastomeric material, comprising:
  a) a base sheet with balloon filling indicia thereon temporarily tackable onto the balloon material; and
  b) an expansible indicator ink mark on the balloon material alignable with the balloon filling indicia to indicate when the balloon is full.

14. The balloon fill gauge of claim 13, wherein the base sheet is non-stretchable.

15. The balloon fill gauge of claim 13, wherein the balloon filler gauge is removably tackable to the balloon material with pressure sensitive adhesive.

16. The balloon fill gauge of claim 13, wherein the balloon filler gauge is removably tackable to the balloon material on the inside of the balloon.

17. The balloon fill gauge of claim 13, wherein the balloon filler gauge is removably tackable to the balloon material on the outside of the balloon.

18. The balloon fill gauge of claim 13, wherein the balloon filling indicia is language-free and the indicia is color coded.

19. The balloon fill gauge of claim 13, wherein the balloon filling indicia is language-free and a novelty visual.

20. The balloon fill gauge of claim 13, wherein the base sheet is made from one of a group comprising paper or plastic.

* * * * *